(12) United States Patent
Mazoyer et al.

(10) Patent No.: US 11,440,608 B2
(45) Date of Patent: Sep. 13, 2022

(54) KICK SCOOTER

(71) Applicant: ID DEVELOPMENT LIMITED, Kowloon (HK)

(72) Inventors: Joseph Mazoyer, Lyons (FR); Philippe Bajard, Lyons (FR)

(73) Assignee: ID DEVELOPMENT LIMITED, TST East (HK)

( * ) Notice: Subject to any disclaimer, the term of this patent is extended or adjusted under 35 U.S.C. 154(b) by 338 days.

(21) Appl. No.: 16/687,805

(22) Filed: Nov. 19, 2019

(65) Prior Publication Data

US 2020/0156728 A1    May 21, 2020

(30) Foreign Application Priority Data

Nov. 19, 2018 (CN) ......................... 201821921195.3

(51) Int. Cl.
*B62K 15/00* (2006.01)
*B62K 3/00* (2006.01)
(Continued)

(52) U.S. Cl.
CPC ............ *B62K 15/006* (2013.01); *B62K 3/002* (2013.01); *B62K 5/05* (2013.01); *B62K 21/16* (2013.01); *B62K 21/24* (2013.01)

(58) Field of Classification Search
CPC ....... B62K 21/24; B62K 15/006; B62K 3/002
See application file for complete search history.

(56) References Cited

U.S. PATENT DOCUMENTS

| | | | | |
|---|---|---|---|---|
| 4,138,131 A | * | 2/1979 | Sommer | B62K 3/002 280/220 |
| 8,500,147 B2 | * | 8/2013 | Johnson | B62K 3/002 280/87.041 |

(Continued)

FOREIGN PATENT DOCUMENTS

| | | | | |
|---|---|---|---|---|
| AT | 520503 A2 | * | 4/2019 | |
| CN | 112298425 A | * | 2/2021 | ............. B62K 21/02 |

(Continued)

*Primary Examiner* — Katy M Ebner
(74) *Attorney, Agent, or Firm* — Defillo & Associates, Inc; Evelyn A. Defillo

(57) ABSTRACT

The invention relates to a kick scooter including a deck assembly (1) and a handlebar assembly (2); the handlebar assembly (2) includes a transversal handlebar (21) and a stand column (22), one end of the stand column (22) being connected to the transversal handlebar (21) and the other end of the stand column (22) being provided with a connecting post (23), an axial direction of the connecting post (23) forming an obtuse angle with an axial direction of the stand column (22); a plug hole (130) is provided in the deck assembly (1) and cooperates with the connecting post (23) by insertion, an axial direction of the plug hole (130) forming a sharp angle with a direction of extension of the deck assembly (1); when the connecting post (23) is located outside the plug hole (130), the handlebar assembly (2) is separated from the deck assembly (1); two locking slots (131) are provided at an insertion opening of the plug hole (130) and arranged respectively on two sides of the plug hole (130); and the connecting post (23) is provided with a locking protrusion (231) that is located inside the locking slot (131) when the connecting post (23) is inserted into the plug hole (130).

11 Claims, 6 Drawing Sheets

(51) Int. Cl.
  *B62K 5/05*     (2013.01)
  *B62K 21/16*    (2006.01)
  *B62K 21/24*    (2006.01)

(56) References Cited

U.S. PATENT DOCUMENTS

| | | | | |
|---|---|---|---|---|
| 8,696,000 | B1* | 4/2014 | Chen | B62K 3/002 |
| | | | | 280/87.041 |
| 10,926,829 | B2* | 2/2021 | McGowan | B62K 21/18 |
| 2012/0319373 | A1* | 12/2012 | Landau | B62K 15/00 |
| | | | | 280/87.041 |
| 2017/0106932 | A1* | 4/2017 | Mazoyer | B62K 3/002 |

FOREIGN PATENT DOCUMENTS

| | | | |
|---|---|---|---|
| EP | 3868636 A1 * | 8/2021 | |
| WO | WO-2017216756 A1 * | 12/2017 | B62B 7/12 |

\* cited by examiner

KICK SCOOTER

FIELD OF THE INVENTION

The invention relates to a kick scooter, and in particular, to a kick scooter that is convenient to store and carry.

BACKGROUND OF THE INVENTION

Kick scooters are mainly for children to use. The design of kick scooters in the prior art focuses only on safety functions and properties of the product, and does not care about its storage. However, how to facilitate the storage and carriage of a kick scooter is a problem that parents of children will necessarily care about. The handlebar part of a kick scooter in the prior art is vertically fixed on the deck and inseparable from the deck. Thus, such a kick scooter is inconvenient to carry and difficult to store.

SUMMARY OF THE INVENTION

Facing the above-described problem, the objective of the invention is to provide a kick scooter that is convenient to store and carry.

The kick scooter provided by the invention comprises a deck assembly and a handlebar assembly, wherein the handlebar assembly comprises a transversal handlebar and a stand column, one end of the stand column being connected to the transversal handlebar and the other end of the stand column being provided with a connecting post, an axial direction of the connecting post forming an obtuse angle with an axial direction of the stand column;

a plug hole is provided in the deck assembly and cooperates with the connecting post by insertion, an axial direction of the plug hole forming a sharp angle with a direction of extension of the deck assembly;

when the connecting post is located outside the plug hole, the handlebar assembly is separated from the deck assembly;

wherein two locking slots are provided at an insertion opening of the plug hole and arranged respectively on two sides of the plug hole; and wherein the connecting post is provided with a locking protrusion that is located inside the locking slot when the connecting post is inserted into the plug hole;

by means of the cooperation between the locking protrusion and the locking slot, the connecting post is inserted into the plug hole at a predetermined angle, and the rotation of the connecting post inside the plug hole is able to be limited;

after the handlebar assembly has rotated 180° around the axial direction of the connecting post, the connecting post is able to be inserted into the plug hole at a changed angle, so as to make the handlebar assembly switch between a deployed position and a folded position.

According to an embodiment, the obtuse angle formed by the axial direction of the connecting post with the axial direction of the stand column is 120° to 150°, and the sharp angle formed by the axial direction of the plug hole with the direction of extension of the deck assembly is 30° to 60°.

According to an embodiment, the obtuse angle formed by the axial direction of the connecting post with the axial direction of the stand column is 135°, and the sharp angle formed by the axial direction of the plug hole with the direction of extension of the deck assembly is 45°.

According to an embodiment, the kick scooter further comprises a locking mechanism for locking the connecting post in the plug hole.

According to an embodiment, the locking mechanism comprises:

a locking pin and an elastic element, the locking pin being provided on the connecting post in such a manner that it is slidable along a radial direction of the connecting post, and a locking hole provided in a wall of the plug hole, inside which the locking pin is located when the connecting post is inserted into the plug hole.

According to an embodiment, there are two locking mechanisms that are symmetrically provided on two sides of the connecting post with the axial direction of the connecting post being the symmetric axis; and wherein there is one locking hole inside which one of the locking pins is located when the connecting post is inserted into the plug hole.

According to an embodiment, the elastic elements of the two locking mechanisms are formed integrally;

the two elastic elements are connected to form a V shape, free ends of two arms of the V being connected respectively with the two locking pins so as to provide an elastic force respectively to the two locking pins; or the two elastic elements are connected to form a U shape, free ends of two arms of the U being connected respectively with the two locking pins so as to provide an elastic force respectively to the two locking pins; or the two elastic elements are connected to form a compression spring, the two ends of which are connected respectively with the two locking pins.

According to an embodiment, the deck assembly is further provided with an unlocking mechanism for ejecting the locking pin out of the locking hole; wherein the unlocking mechanism comprises an unlocking element that is connected to the deck assembly in such a manner that it is slidable along the radial direction of the plug hole and extends to the locking hole; when the unlocking element slides towards the plug hole, the unlocking element abuts against the locking pin and causes it to move outside the locking hole.

According to an embodiment, the unlocking mechanism further comprises an unlocking spring that is arranged around the unlocking element for providing an elastic force to make the unlocking element move away from the locking pin.

According to an embodiment, the locking mechanisms is provided at the plug hole of the deck assembly;

locking holes are provided on the connecting post;

a sliding slot is provided on the wall of the plug hole;

the locking pin of the locking mechanism is provided in the sliding slot in such a manner that it is slidable along the radial direction of the plug hole, and one end of the locking pin extends to the plug hole in a lock position;

an elastic element is connected to the locking pin for providing an elastic force to cause one end of the locking pin to be located inside the locking hole; the other end of the locking pin extends to the outer side of the deck assembly.

According to an embodiment, the handlebar assembly, at the lower end thereof, and the deck assembly, at the bottom of the plug hole, comprise respective complementary shapes that are capable to engage each other for blocking the pivoting of the handlebar assembly with respect to the plug hole, such as a transverse rib or diametrically arranged blocks at the bottom of the plug hole, on which the handlebar assembly engages by means of a transverse groove, or such as a central prismatic block at the bottom of the plug hole, on which the handlebar assembly engages by means of a fitting corresponding cavity.

According to an embodiment, a reinforcing rib is provided at the junction between a connecting tube and of the connecting post, the reinforcing rib being connected with the locking protrusion.

According to an embodiment, the deck assembly has a front longitudinal end and a rear longitudinal end;

the transversal handlebar has an axis;

one of the two sides of the plug hole on which one locking slot is provided is arranged toward the front longitudinal end of the deck assembly and the other side of the plug hole on which the other locking slot is provided is arranged toward the rear longitudinal end of the deck assembly;

the locking protrusion extends in a plane perpendicular to the axis of the transversal handlebar.

According to an embodiment, said locking protrusion is a first locking protrusion;

the connecting post is provided with a second locking protrusion, the first locking protrusion is inserted in said one of the locking slots and the second locking protrusion is inserted in said other of the locking slots when the connecting post is inserted in the plug hole and locked therein by the locking mechanism.

In the kick scooter provided by embodiments of the invention, since the insertion connection between the handlebar assembly and the deck assembly is achieved by the cooperation between the plug hole and the connecting post, the handlebar assembly is separable from the deck assembly, and after the separation, the handlebar assembly can be rotated to cooperate with the deck assembly at a different angle. The axial direction of the connecting post forms an obtuse angle with the axial direction of the stand column, and the axial direction of the plug hole forms a sharp angle with the direction of extension of the deck assembly. After the connecting post has rotated 180°, one can change the state of the stand column to make the stand column switch between being away from the deck assembly and being close to the deck assembly, thus enabling the handlebar to switch between a deployed position and a folded position. This renders the kick scooter foldable and convenient to store and carry. Since the handlebar assembly of the kick scooter is separable from the deck assembly, after the handlebar assembly is removed, the deck assembly can be used separately to slide as a skateboard that is convenient to use.

BRIEF DESCRIPTION OF THE DRAWINGS

To more clearly describe the technical solutions of the invention, the accompanying drawings to be used in modes of realization are described briefly. Obviously, the accompanying drawings described below merely show some modes of realization of the invention. To a person skilled in the art, other drawings can be obtained without creative labor based on those accompanying drawings.

DETAILED DESCRIPTION OF THE EMBODIMENTS

Figure 1:
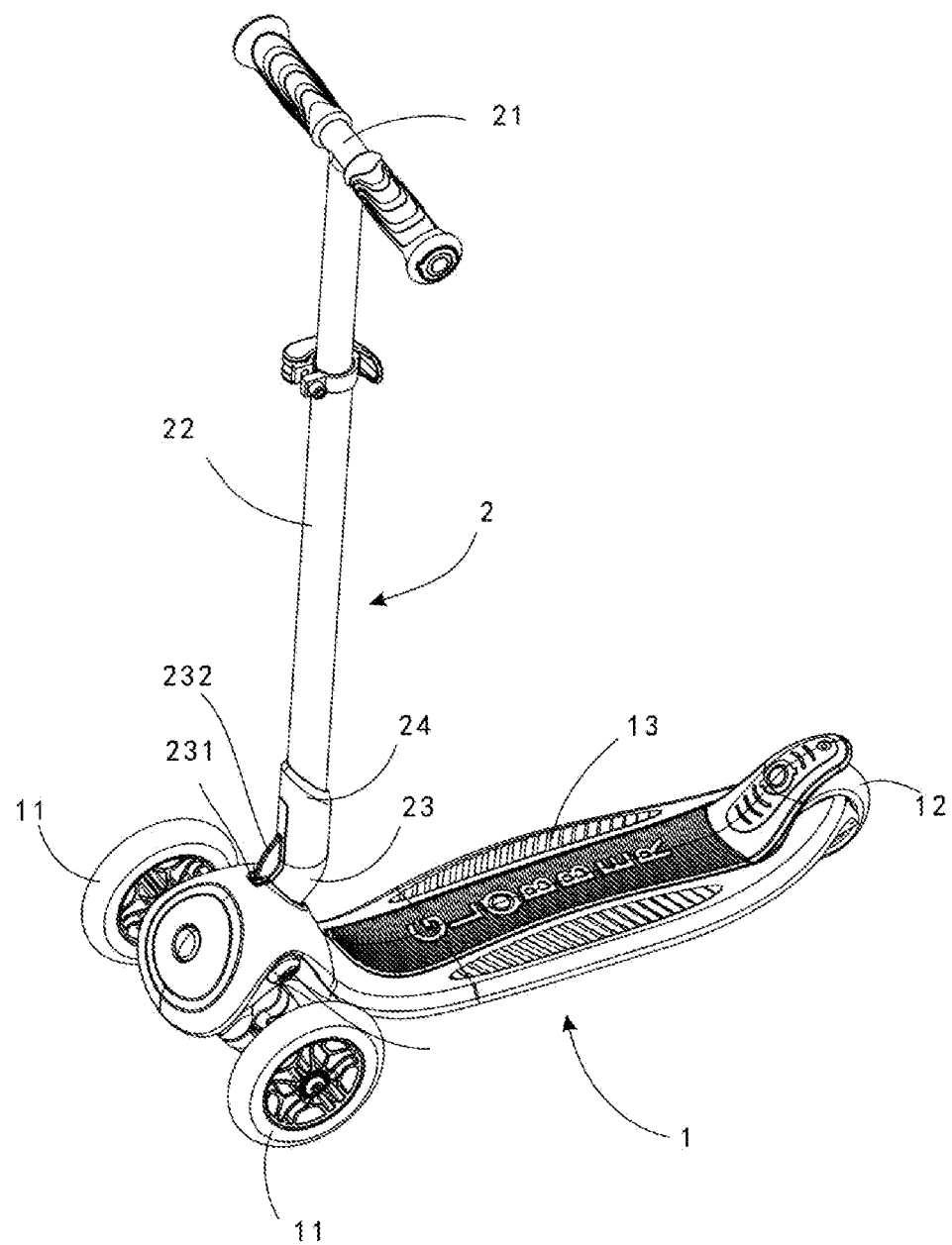
FIG. 1 is a perspective view of a kick scooter provided by a preferred embodiment of the invention in a deployed state.
Figure 2:
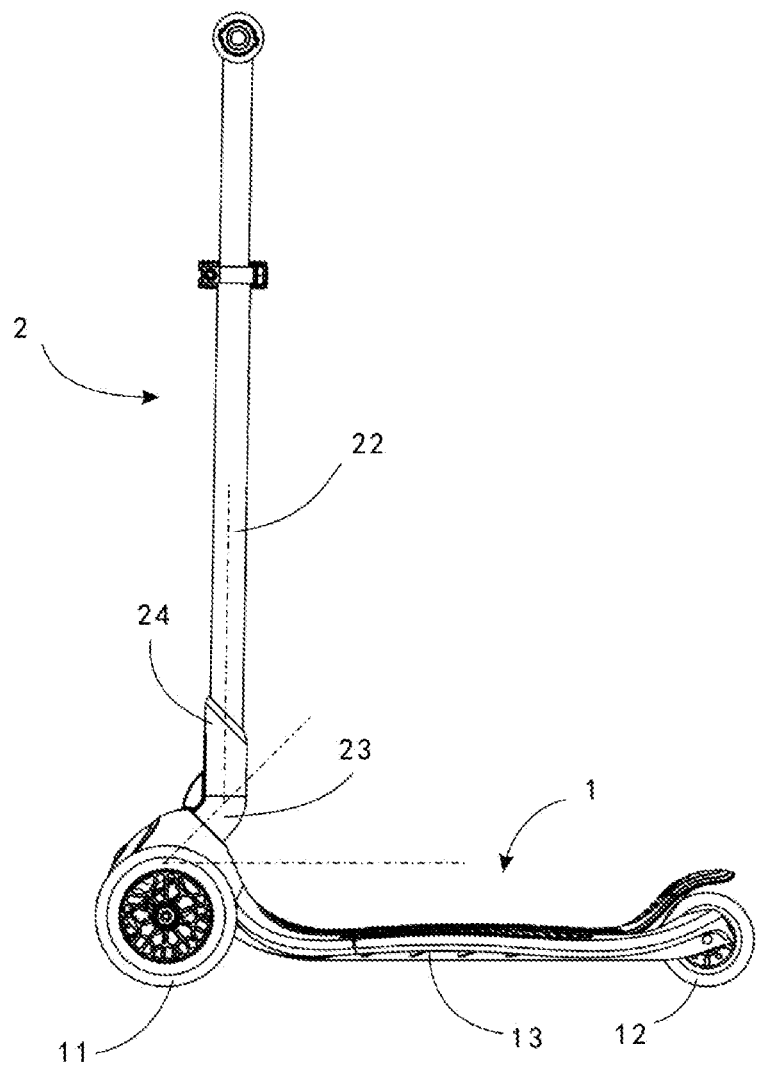
FIG. 2 is a schematic side view of the kick scooter of FIG. 1 in a deployed state.

The technical solutions in embodiments of the invention will be described below clearly and completely in reference to the accompanying drawings of embodiments of the invention. Obviously, the embodiments described are merely some but not all of the embodiments of the invention. All other embodiments obtained by a person skilled in the art based on the embodiments in the invention without creative labor fall within the protection scope of the invention.

Please refer to FIGS. 1 to 7 collectively. Preferred embodiments of the invention provide a kick scooter comprising a deck assembly 1 and a handlebar assembly 2 separable from the deck assembly 1. When the two assemblies are separated, the handlebar assembly 2 can cooperate with the deck assembly 1 by insertion at different angles, achieving a switch between a deployed position and a folded position.

As shown in FIGS. 1 to 5, the handlebar assembly 2 comprises a transversal handlebar 21 and a stand column 22 one end of which is connected to the transversal handlebar 21 and the other end is provided with a connecting post 23. The axial direction of the connecting post 23 forms an obtuse angle with the axial direction of the stand column 22. There is a plug hole 130 on the deck assembly 1 that cooperates with the connecting post 23 by insertion. The axial direction of the plug hole 130 forms a sharp angle with the direction of extension of the deck assembly 1. It can be understood that, in an inserted position, the plug hole 130 is provided to be concentric with the connecting post 23. When the connecting post 23 is located outside the plug hole 130, the handlebar assembly 2 is separated from the deck assembly 1. After the handlebar assembly 2 rotates 180° around the axial direction of the connecting post 23, the connecting post 23 can be inserted into the plug hole 130 at a changed angle, so as to switch the handlebar assembly 2 between a deployed position and a folded position.

Since the insertion connection between the handlebar assembly 2 and the deck assembly 1 is achieved by the cooperation between the plug hole 130 and the connecting post 23, the handlebar assembly 2 is separable from the deck assembly 1, and after the separation, the handlebar assembly 2 is rotated so as to cooperate with the deck assembly 1 at a different angle. The axial direction of the connecting post 23 forms an obtuse angle with the axial direction of the stand column 22, and the axial direction of the plug hole 130 forms a sharp angle with the direction of extension of the deck assembly 1. After the connecting post 23 rotates 180°, one can change the state of the stand column 22, making the stand column 22 switch between being away from the deck assembly 1 and being close to the deck assembly 1, so as to enable the handlebar assembly 2 to switch between a deployed position and a folded position.

Since the handlebar assembly 2 of the kick scooter is separable from the deck assembly 1, after the handlebar assembly 2 is removed, the deck assembly 1 can be used separately to slide as a skateboard that is convenient to use.

Preferably, the obtuse angle formed by the axial direction of the connecting post 23 with the axial direction of the stand column 22 is 120° to 150°, and the sharp angle formed by the axial direction of the plug hole 130 with the direction of extension of the deck assembly 1 is 30° to 60°, so that the stand column 22 changes to relatively proper positions in the folded and deployed states, and is convenient to fold and to use. More particularly, in the present embodiment, the obtuse angle formed by the axial direction of the connecting post 23 with the axial direction of the stand column 22 is 135°, and sharp angle formed by the axial direction of the plug hole 130 with the direction of extension of the deck assembly 1 is 45°. In the folded state, the axial direction of the stand column 22 can be parallel to or nearly parallel to the direction of extension of the deck assembly 1, i.e., parallel to the upper surface of the deck assembly 1, so as to facilitate storage and carriage. In the deployed state, the axial direction of the stand column 22 is perpendicular to or nearly perpendicular to the direction of extension of the deck assembly 1, i.e., perpendicular to the upper surface of the deck assembly 1, so as to facilitate utilization.

Figure 3:
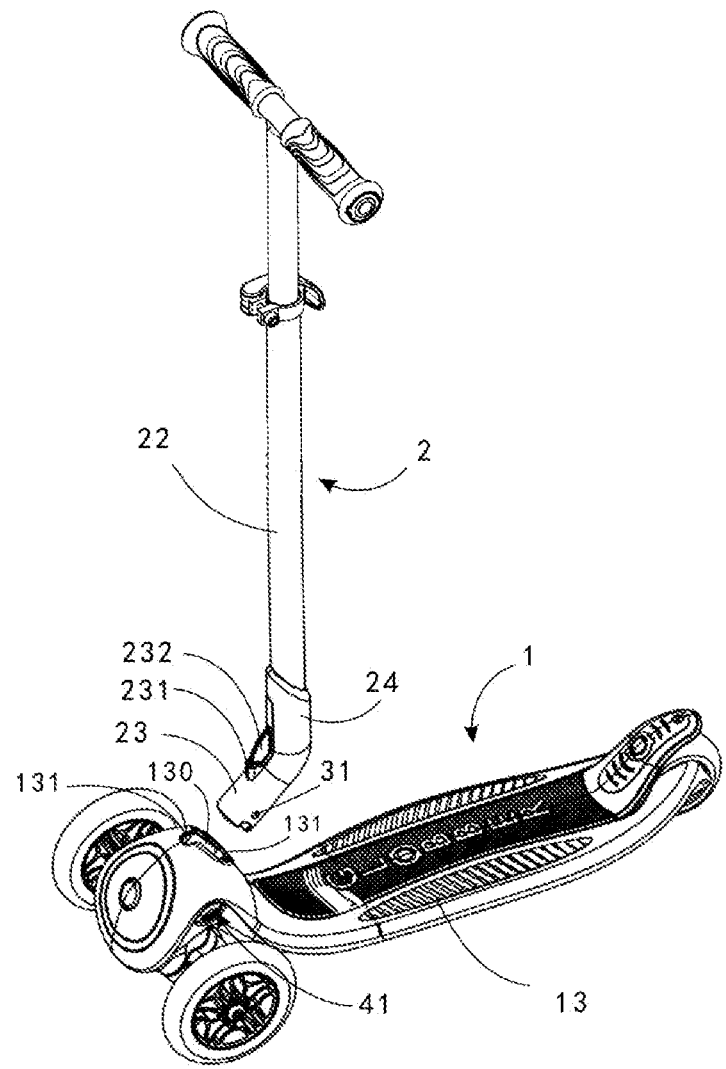
FIG. 3 is a schematic diagram of the kick scooter of FIG. 1 with the handlebar assembly separated from the deck assembly.
Figure 4:
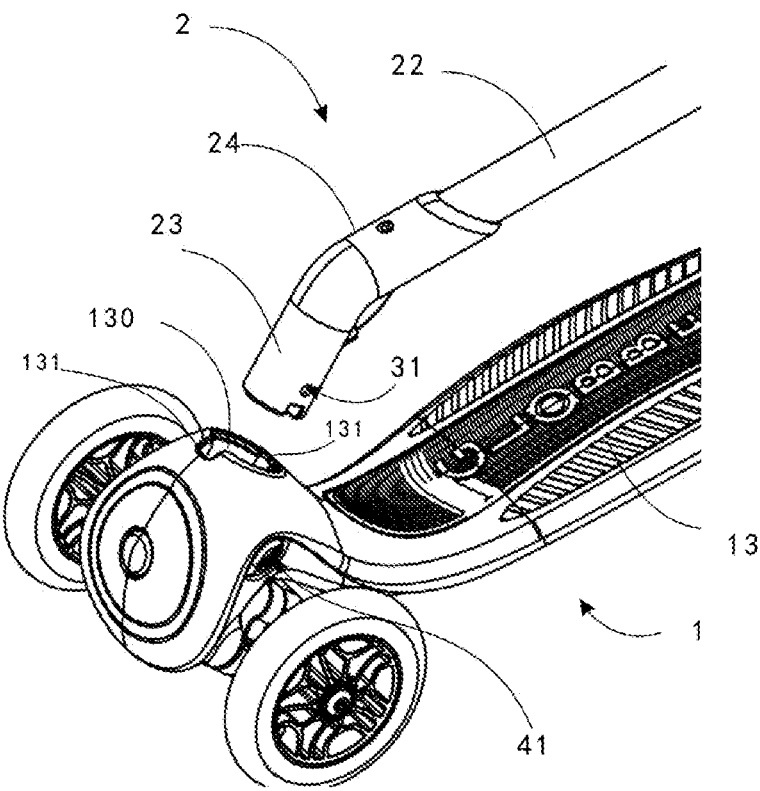
FIG. 4 is a schematic diagram of the kick scooter of FIG. 3 after the connecting post rotates 180°.
Figure 5:
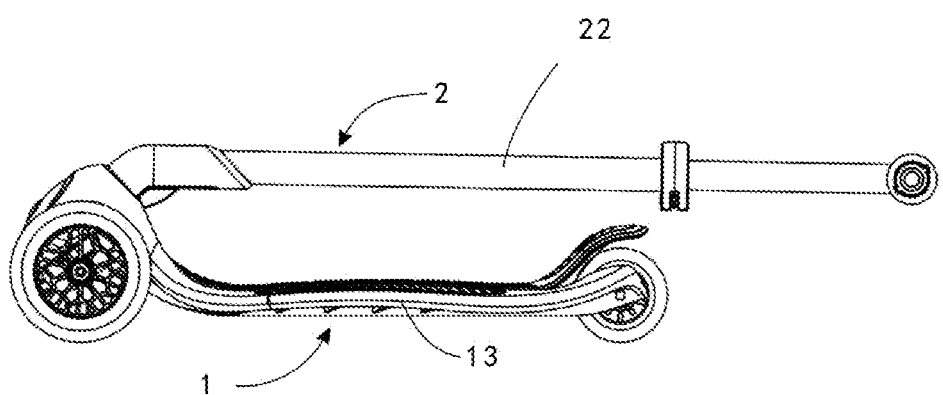
FIG. 5 is a schematic side diagram of the kick scooter of FIG. 1 in a folded state.

As shown in FIGS. 3 and 4, two locking slots 131 that are provided, respectively, on the two sides of the plug hole 130, are arranged at an insertion opening of the plug hole 130. The connecting post 23 is provided with locking protrusions 231. When the connecting post 23 is inserted into the plug hole 130, the locking protrusion 231 is located inside a locking slot 131. By means of the cooperation between the locking protrusion 231 and the locking slot 131, the connecting post 23 is inserted into the plug hole 130 at a predetermined angle, and the rotation of the connecting post 23 inside the plug hole 130 can be limited. In the present embodiment, there is one locking protrusion 231. When the connecting post 23 is inserted into the plug hole 130 at different angles, the locking protrusion 231 cooperates, respectively, with the two locking slots 131. Here, in another modes of realization, there can be two locking protrusions 231 that cooperate, respectively, with the two locking slots 131.

The connecting post 23, the stand column 22, and the transversal handlebar 21 all have a tube-shaped general shape, so as to reduce the overall weight of the kick scooter. The connecting post 23 is provided with a connecting tube 24 inside which an end of the stand column 22 is inserted so as to increase the strength of the connection between the connecting post 23 and the stand column 22. A reinforcing rib 232 is provided at the junction between the connecting tube 24 and the connecting post 23. The reinforcing rib 232 is connected with the locking protrusion 231, so as to increase structural strength. Here, in other modes of realization, the connecting post 23 and the stand column 22 can also be formed integrally.

As shown in FIG. 1, the deck assembly 1 comprises a deck 13, front wheels 11, and a rear wheel 12. The deck 13 has an oblong shape. The front wheels 11 and the rear wheel 12 are provided, respectively, at the two ends of the deck 13. It can be understood that the above-mentioned direction of extension of the deck assembly 1 is the direction of alignment of the front and rear wheels 12. There are two front wheels 11 and one rear wheel 12, making the kick scooter a three-wheel kick scooter.

Figure 6:
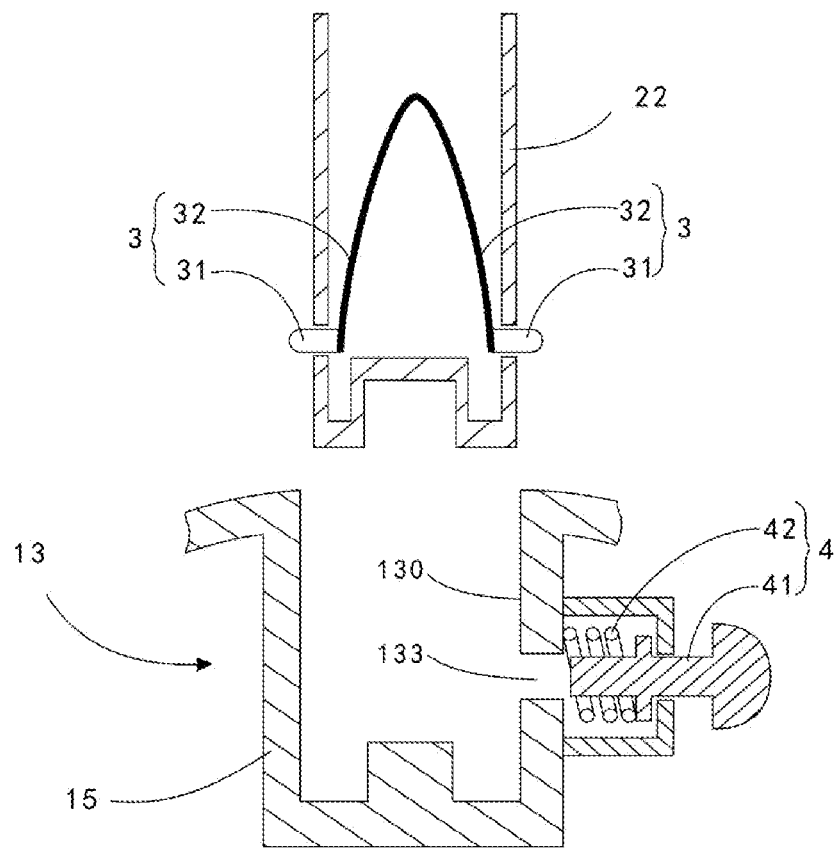
FIG. 6 is a schematic diagram of the kick scooter of FIG. 1 with the connecting post separated from the plug hole.
Figure 7:
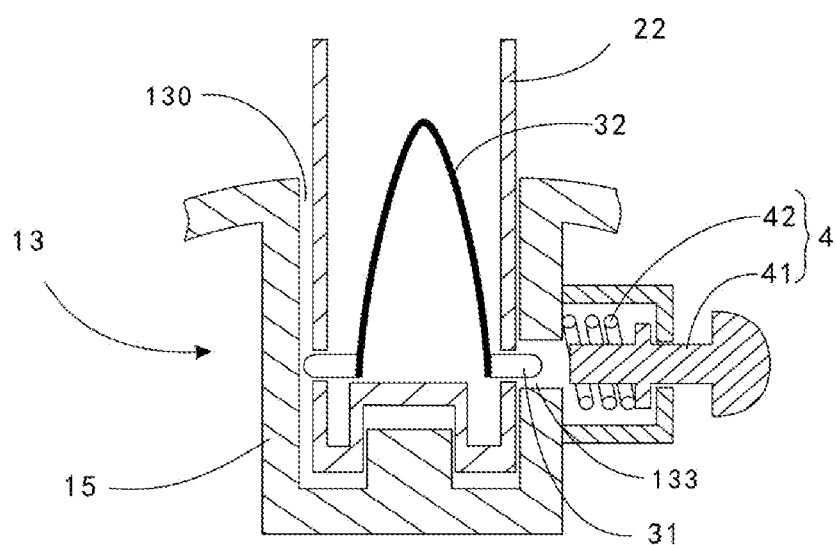
FIG. 7 is a schematic diagram of FIG. 6 when the connecting post and the plug hole cooperate with each other by insertion.

To facilitate the provision of the plug hole 130, the deck assembly 1 is provided with a plug tube 15 (as shown in FIGS. 6 and 7). The plug hole 130 is formed inside the plug tube 15. More particularly, the plug tube 15 is located at the front end of the deck 13, i.e., where the front wheels 11 are provided.

As shown in FIGS. 6 and 7, the kick scooter further comprises locking mechanisms 3 for locking the connecting post 23 inside the plug hole 130. In the present embodiment, there are two locking mechanisms 3 that are provided on the connecting post 23, and the two locking mechanisms 3 are symmetrically provided, respectively, on the two sides of the connecting post 23, with the axial direction of the connecting post 23 being the symmetric axis. The locking mechanisms 3 comprise a locking pin 31 and an elastic element 32. The locking pins 31 are provided on the connecting post 23 in such a manner that they are slidable along the radial direction of the connecting post 23. The elastic elements 32 are connected to the locking pins 31 for providing an elastic force to make the locking pins 31 protrude from the outer surface of the connecting post 23.

The wall of the plug hole 130 is provided with a locking hole 133. When the connecting post 23 is inserted into the plug hole 130, one of the locking pins 31 is inside the locking hole 133, so that the connecting post 23 is locked inside the plug hole 130. When the connecting post 23 is inserted into the plug hole 130 at different angles, the locking hole 133 cooperates, respectively, with the two locking pins 31. That is to say, in the folded position, only one locking pin 31 is inside the locking hole 133, while in the deployed position, only the other locking pin 31 is inside the locking hole 133.

Here, in other modes of realization, there can be one locking mechanism 3 and two locking holes 133 that are provided symmetrically, respectively, on two side walls of the plug hole 130 with the axial direction of the plug hole 130 being the symmetrical axis. When the connecting post 23 is inserted into the plug hole 130 at different angles, the locking pin 31 cooperates, respectively, with the two locking holes 133. Alternatively, there are two locking mechanism 3 and two locking holes 133.

Further, in the present embodiment, the elastic elements 32 of the two locking mechanisms 3 are formed integrally. More particularly, the two elastic elements 32 are connected to form a V shape. The free ends of the two arms of the V are connected, respectively, with the two locking pins 31, so as to provide an elastic force, respectively, to the two locking pins 31. In other modes of realization, the two elastic elements 32 are connected to form a U shape. The free ends of the two arms of the U are connected, respectively, with the two locking pins 31, so as to provide an elastic force, respectively, to the two locking pins 31. Alternatively, the two elastic elements 32 can also be connected to form a compression spring, the two ends of which are connected, respectively, with the two locking pins 31, so as to provide an elastic force to the two locking pins 31. In further modes of realization, the elastic elements 32 of the two locking mechanisms 3 can also be separate, in the form of a compression spring, flat spring, etc., and provide an elastic force to the locking pins 31 respectively in an independent manner.

In the present embodiment, the deck assembly 1 is further provided with an unlocking mechanism 4 for ejecting the locking pin 31 out of the locking hole 133. The unlocking mechanism 4 comprises an unlocking element 41 that is connected to the deck assembly 1 in such a manner that it is slidable along the radial direction of the plug hole 130, and extends to the locking hole 133. When the unlocking element 41 slides towards the plug hole 130, the unlocking element 41 abuts against the locking pin 31, and makes the locking pin 31 move out of the locking hole 133. At this moment, the connecting post 23 can be taken out of the plug hole 130.

Further, the unlocking mechanism 4 further comprises an unlocking spring 42 that is provided around the unlocking element 41 for providing an elastic force causing the unlocking element 41 to move away from the locking pin 31, so as to make the unlocking element 41 automatically recover after unlocking.

Figure 8:
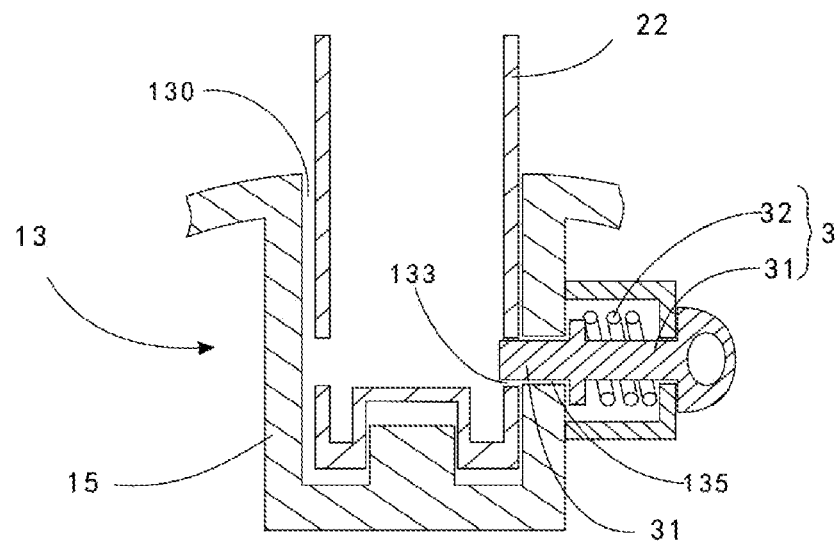
FIG. 8 is a schematic diagram of a kick scooter provided by another embodiment of the invention when the connecting post and the plug hole cooperate with each other by insertion.

In the above-described mode of realization, the locking mechanisms 3 are provided on the connecting post 23. In other modes of realization, as shown in FIG. 8, locking mechanisms 3 can also be provided at the plug hole 130 of the deck assembly 1. The locking holes 133 are provided on the connecting post 23. A sliding slot 135 can be provided on the wall of the plug hole 130. The locking pin 31 of the locking mechanism 3 is provided in the sliding slot 135 in such a manner that it is slidable along the radial direction of the plug hole 130, and one end of the locking pin 31 extends to the plug hole 130. The elastic element 32 is connected to the locking pin 31 for providing an elastic force to cause one end of the locking pin 31 to be located inside the locking hole 133. The other end of the locking pin 31 extends to the outer side of the deck assembly 1. A user is able to move one end of the locking pin 31 outside the locking hole 133 by simply pulling the other end of the locking pin 31 from the outer side of the deck assembly 1, thus enabling the connecting post 23 to be removed from the plug hole 130. To facilitate the pulling of the locking pin 31, the other end of the locking pin 31 can be provided with a structure such as a pull ring.

Figure 9:
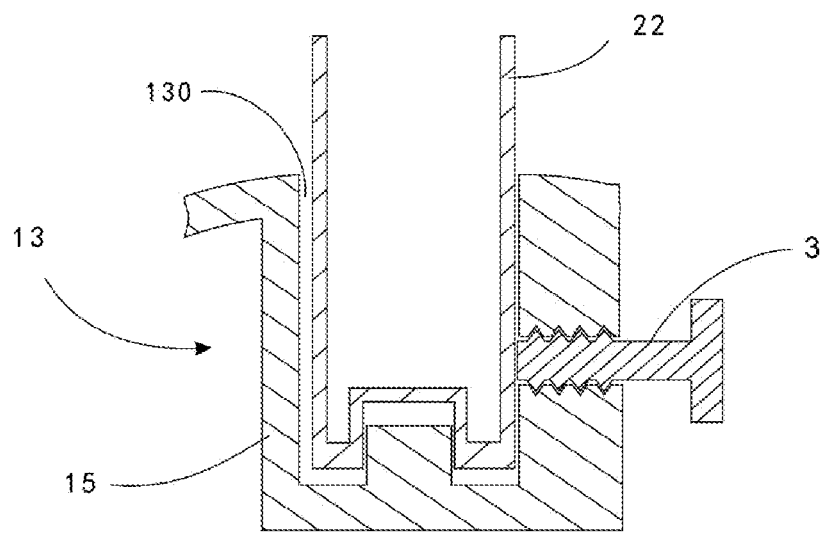
FIG. 9 is a schematic diagram of a kick scooter provided by yet another embodiment of the invention when the connecting post and the plug hole cooperate with each other by insertion.

In the above-described mode of realization, the locking mechanism 3 consists of a locking pin 31 and an elastic element 32. It cooperates with the locking holes 133 to achieve the positioning and cooperation between the connecting post 23 and the plug hole 130. In other modes of realization, as shown in FIG. 9, the locking mechanism 3 can also be a locking screw, and the deck assembly 1 is provided with a threaded hole extending to the plug hole 130. The nut of the locking screw is located at the outer surface of the deck assembly 1. By rotating the locking screw to make its end move into the plug hole 130 and abut against the connecting post 23, the locking of the connecting post 23 inside the plug hole 130 can be achieved. Alternatively, the locking mechanism 3 can also be a hoop provided around the outer side of the plug tube 15. When the connecting post 23 is inserted inside the plug hole 130 of the plug tube 15, to lock the connecting post 23 inside the plug hole 130, one needs only to lock the hoop.

In the above-described modes of realization, the locking of the connecting post 23 inside the plug hole 130 is achieved through the locking mechanism 3. In other modes of realization, the locking can be achieved by the cooperation between the connecting post 23 and the plug hole 130, without using the locking mechanism 3.

Additionally, the handlebar assembly 2, at the lower end thereof, and the deck assembly 1, at the bottom of the plug hole 130, can comprise respective complementary shapes that are capable to engage each other for blocking the pivoting of the handlebar assembly 2 with respect to the plug hole 130, and thus stabilize the engagement of the handlebar assembly with the deck assembly and namely limit the forces applied on the pins 31 or screw 3. Such complementary shapes can consist of a transverse rib or of diametrically arranged blocks at the bottom of the plug hole 130, on which the handlebar assembly 2 engages by means of a transverse groove that can be seen on FIG. 4, or such as a central prismatic block at the bottom of the plug hole 130, on which the handlebar assembly 2 engages by means of a fitting corresponding cavity, as seen on FIGS. 6-9.

What has been disclosed above are merely preferred embodiments of the invention, and obviously cannot be used to limit the scope of the claims of the invention. Therefore, all equivalent modifications made based on the claims of the invention fall within the scope covered by the invention.

The invention claimed is:

1. A kick scooter comprising a deck assembly (1) and a handlebar assembly (2);
   the handlebar assembly (2) comprises a transversal handlebar (21) and a stand column (22), one end of the stand column (22) being connected to the transversal handlebar (21) and the other end of the stand column (22) being provided with a connecting post (23), an axial direction of the connecting post (23) forming an obtuse angle with an axial direction of the stand column (22);
   a plug hole (130) is provided in the deck assembly (1) and cooperates with the connecting post (23) by insertion, an axial direction of the plug hole (130) forming a sharp angle with a direction of extension of the deck assembly (1);
   when the connecting post (23) is located outside the plug hole (130), the handlebar assembly (2) is separated from the deck assembly (1);
   wherein two locking slots (131) are provided at an insertion opening of the plug hole (130) and arranged respectively on two sides of the plug hole (130); and wherein the connecting post (23) is provided with a locking protrusion (231) that is located inside the one of the locking slots (131) when the connecting post (23) is inserted into the plug hole (130);
   by the cooperation between the locking protrusion (231) and the locking slot (131), the connecting post (23) is inserted into the plug hole (130) at a predetermined angle, and the rotation of the connecting post (23) inside the plug hole (130) is able to be limited;
   after separating the connecting post (23) from the plug hole (130) and the handlebar assembly (2) has rotated 180° around the axial direction of the connecting post (23), the connecting post (23) is able to be inserted into the plug hole (130) at a changed angle, so as to make the handlebar assembly (2) switch between a deployed position and a folded position;
   wherein the kick scooter further comprises a locking mechanism (3) for locking the connecting post (23) in the plug hole (130);
   wherein the locking mechanism (3) comprises:
      a locking pin (31) and an elastic element (32), the locking pin (31) being provided on the connecting post (23), and
      a locking hole (133) provided in a wall of the plug hole (130), inside which the locking pin (31) is located when the connecting post (23) is inserted into the plug hole (130);
   wherein the deck assembly (1) is further provided with an unlocking mechanism (4) for ejecting the locking pin (31) out of the locking hole (133); wherein the unlocking mechanism (4) comprises an unlocking element (41) that is connected to the deck assembly (1) in such a manner that is slidable along the radial direction of the plug hole (130) and extends to the locking hole (133); when the unlocking element (41) slides towards the plug hole (130), the unlocking element (41) abuts against the locking pin (31) and causes it to move outside the locking hole (133).

2. The kick scooter according to claim 1, wherein the obtuse angle formed by the axial direction of the connecting post (23) with the axial direction of the stand column (22) is 120° to 150°, and the sharp angle formed by the axial direction of the plug hole (130) with the direction of extension of the deck assembly (1) is 30° to 60°.

3. The kick scooter according to claim 2, wherein the obtuse angle formed by the axial direction of the connecting post (23) with the axial direction of the stand column (22) is 135°, and the sharp angle formed by the axial direction of the plug hole (130) with the direction of extension of the deck assembly (1) is 45°.

4. The kick scooter according to claim 1, wherein there are two locking mechanisms (3) that are symmetrically provided on two sides of the connecting post (23) with the axial direction of the connecting post (23) being the symmetric axis; and wherein there is one locking hole (133) inside which one of the locking pins (31) is located when the connecting post (23) is inserted into the plug hole (130).

5. The kick scooter according to claim 4, wherein the elastic elements (32) of the two locking mechanisms (3) are formed integrally;
wherein the two elastic elements (32) are connected to form a V shape, free ends of two arms of the V being connected respectively with the two locking pins (31) so as to provide an elastic force respectively to the two locking pins (31); or
the two elastic elements (32) are connected to form a U shape, free ends of two arms of the U being connected respectively with the two locking pins (31) so as to provide an elastic force respectively to the two locking pins (31); or
the two elastic elements (32) are connected to form a compression spring, the two ends of which are connected respectively with the two locking pins (31).

6. The kick scooter according to claim 1, wherein the unlocking mechanism (4) further comprises an unlocking spring (42) that is arranged around the unlocking element (41) for providing an elastic force to make the unlocking element (41) move away from the locking pin (31).

7. The kick scooter according to claim 1, wherein:
the locking mechanism (3) is provided at the plug hole (130) of the deck assembly (1);
locking holes (133) are provided on the connecting post (23);
a sliding slot (135) is provided on the wall of the plug hole (130);
the locking pin (31) of the locking mechanism (3) is provided in the sliding slot (135) in such a manner that it is slidable along the radial direction of the plug hole (130), and one end of the locking pin (31) extends to the plug hole (130) in a lock position;
an elastic element (32) is connected to the locking pin (31) for providing an elastic force to cause one end of the locking pin (31) to be located inside the locking hole (133); the other end of the locking pin (31) extends to the outer side of the deck assembly (1).

8. The kick scooter according to claim 1, wherein the handlebar assembly (2), at the lower end thereof, and the deck assembly (1), at the bottom of the plug hole (130), comprise respective complementary shapes that are capable to engage each other for blocking the pivoting of the handlebar assembly (2) with respect to the plug hole (130), the respective complementary shapes includes a transverse rib or diametrically arranged blocks at the bottom of the plug hole, on which the handlebar assembly engages by means of a transverse groove, or a central prismatic block at the bottom of the plug hole, on which the handlebar assembly engages by means of a fitting corresponding cavity.

9. The kick scooter according to claim 1, wherein a reinforcing rib (232) is provided at the junction between a connecting tube (24) and of the connecting post (23), the reinforcing rib (232) being connected with the locking protrusion (231).

10. The kick scooter according to claim 1, wherein:
the deck assembly (1) has a front longitudinal end and a rear longitudinal end;
the transversal handlebar (21) has an axis;
one of the two sides of the plug hole (130) on which one locking slot (131) is provided is arranged toward the front longitudinal end of the deck assembly (1) and the other side of the plug hole (130) on which the other locking slot (131) is provided is arranged toward the rear longitudinal end of the deck assembly (1);
the locking protrusion (231) extends in a plane perpendicular to the axis of the transversal handlebar (21).

11. The kick scooter according to claim 1, wherein:
said locking protrusion (231) is a first locking protrusion;
the connecting post (23) is provided with a second locking protrusion (231), the first locking protrusion (231) is inserted in said one of the locking slots (131) and the second locking protrusion (231) is inserted in said other of the locking slots (131) when the connecting post (23) is inserted in the plug hole (130) and locked therein by the locking mechanism (3).

* * * * *